(12) United States Patent
Gunnarsson et al.

(10) Patent No.: US 9,706,526 B2
(45) Date of Patent: Jul. 11, 2017

(54) METHODS AND ARRANGEMENTS FOR SUPPORTING RANDOM ACCESS IN CELLULAR COMMUNICATION SYSTEM

(75) Inventors: Fredrik Gunnarsson, Linköping (SE); Mehdi Amirijoo, Linköping (SE); Bo Hagerman, Tyresö (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 105 days.

(21) Appl. No.: 14/342,400

(22) PCT Filed: Sep. 8, 2011

(86) PCT No.: PCT/SE2011/051092
§ 371 (c)(1),
(2), (4) Date: Mar. 3, 2014

(87) PCT Pub. No.: WO2013/036184
PCT Pub. Date: Mar. 14, 2013

(65) Prior Publication Data
US 2014/0211748 A1 Jul. 31, 2014

(51) Int. Cl.
*H04W 72/02* (2009.01)
*H04W 72/04* (2009.01)
*H04W 74/08* (2009.01)

(52) U.S. Cl.
CPC ....... *H04W 72/02* (2013.01); *H04W 72/0426* (2013.01); *H04W 74/0833* (2013.01)

(58) Field of Classification Search
CPC ............. H04W 72/02; H04W 72/0426; H04W 74/0833

USPC .... 370/310, 328, 329, 338, 351, 389, 395.1, 370/395.4, 431, 442, 443, 445, 447, 458, 370/461, 462
See application file for complete search history.

(56) References Cited

U.S. PATENT DOCUMENTS

| | | | |
|---|---|---|---|
| 2009/0238122 A1* | 9/2009 | Vukovic | H04W 74/04 370/329 |
| 2010/0039948 A1* | 2/2010 | Agrawal | H04W 72/082 370/252 |
| 2010/0067470 A1* | 3/2010 | Damnjanovic et al. | 370/329 |
| 2010/0232318 A1* | 9/2010 | Sarkar | 370/254 |
| 2011/0092209 A1* | 4/2011 | Gaal | H04W 16/12 455/436 |
| 2012/0063305 A1* | 3/2012 | Chiu | H04W 74/0833 370/230 |

(Continued)

OTHER PUBLICATIONS

Unknown, Author. "HeNB Interference Coordination." Motorola. 3GPP TSG-RAN WG1 Meeting #59. R1-094839. Jeju, South Korea. Nov. 8-14, 2009. 1-4.

(Continued)

*Primary Examiner* — Obaidul Huq
(74) *Attorney, Agent, or Firm* — Murphy, Bilak & Homiller, PLLC

(57) ABSTRACT

Methods and nodes in a cellular communication system for supporting Random Access. A method in a first network node involves determining at least one uplink radio resource amongst a plurality of radio resources, and refraining from scheduling uplink communication in the at least one uplink radio resource, thus enabling a UE in an area with an uplink/downlink imbalance to perform Random Access to a neighbor second network node (B).

23 Claims, 9 Drawing Sheets

(56) References Cited

U.S. PATENT DOCUMENTS

2013/0315094 A1* 11/2013 Vannithamby et al. ...... 370/252

OTHER PUBLICATIONS

Unknown, Author. "Inter-cell Interference Mitigation between PRACH and PUCCH/PUSCH in Heterogeneous Networks." MediaTek Inc. 3GPP TSG RAN WG1 Meeting #61bis. R1-103574. Dresden, Germany. Jun. 28-Jul. 2, 2010. 1-4.

Unknown, Author. "LTE Random Access Use Cases." LG Electronics. 3GPP TSG RAN WG2 Meeting #52 / WG1 Meeting #44bis. R2-060890. Athens, Greece. Feb. 13-17, 2006. 1-6.

* cited by examiner

PRIOR ART

⬬ High traffic area/Hot Spot

PRIOR ART

| ⬭ Macro cell | ⬬ Femto cell |
| ⬬ Pico cell | ⬬ Relay |

| RACH configuration | System frame number SysF | Subframe number SubF |
|---|---|---|
| 0 | Even | 1 |
| 1 | Even | 4 |
| 2 | Even | 7 |
| 3 | Any | 1 |
| 4 | Any | 4 |
| 5 | Any | 7 |
| 6 | Any | 1, 6 |
| 7 | Any | 2, 7 |
| 8 | Any | 3, 8 |
| 9 | Any | 1, 4, 7 |
| 10 | Any | 2, 5, 8 |
| 11 | Any | 3, 6, 9 |
| 12 | Any | 0, 2, 4, 6, 8 |
| 13 | Any | 1, 3, 5, 7, 9 |
| 14 | Any | 0, 1, 2, 3, 4, 5, 6, 7, 8, 9 |
| 15 | Even | 9 |

METHODS AND ARRANGEMENTS FOR SUPPORTING RANDOM ACCESS IN CELLULAR COMMUNICATION SYSTEM

TECHNICAL FIELD

The invention relates generally to support of Random Access in a cellular communication system.

BACKGROUND

The concept of Random Access (RA) is used in cellular networks e.g. in order for mobile terminals (UEs), which are not yet known to the network, to establish contact with a cellular network. The possibility for a UE to request a connection setup by RA is a fundamental requirement for any cellular system. For example, in LTE, RA is used for several purposes, including:
- for initial access when establishing a radio link;
- to re-establish a radio link after radio-link failure;
- for handover when uplink synchronization needs to be established to the new cell;
- to establish uplink synchronization if uplink or downlink data arrives when the UE is in RRC_CONNECTED state, and the uplink is not synchronized;
- for the purpose of positioning using positioning methods based on uplink measurements; and
- as a scheduling request if no dedicated scheduling request resources have been configured on PUCCH (Physical Uplink Control Channel).

LTE RA is described in more detail e.g. in 3GPP TS 36.213, chapter 6, and in 3GPP TS 36.321, section 5.1.

It is vital for cellular system performance and accessibility that the RA procedure results in a successful contact with the network, and preferably without any significant delays, which may cause user dissatisfaction.

In a cellular network, there may be areas with "high traffic", i.e. a high concentration of users. An exemplifying cell 100 comprising areas 103 with a high concentration of users is illustrated in FIG. 1a. In such high traffic areas 103 it may be desired to deploy additional capacity in order e.g. to keep the user satisfaction. Capacity could be added in the form of an additional macro base station, generating/serving a cell which covers one or more of the area(s) in need of extra capacity. Capacity could also be added in the form of additional nodes with lower output power, as compared to a macro base station, and thus covering a relatively smaller area, to which the desired capacity boost is concentrated.

There may also be areas, e.g. within a macro cell, with unfavorable radio conditions or "bad coverage", where there may be a need for coverage extension. One way to achieve a coverage extension is to deploy an additional node, e.g. a node with a low output power, which concentrates the coverage boost to a relatively small area, e.g. where it is most needed.

One argument for choosing nodes with lower output power for increasing capacity or coverage as in the above cases is that the impact on the "original" macro nodes/network can be minimized. That is, by that the interference to an "original" macro node, with a coverage which at least partially overlaps the coverage of the "added" lower output power node, may be limited to a relatively small area.

FIG. 1b illustrates a macro base station 102, which provides a wide area coverage 100 (also called macro cell). FIG. 1b also shows examples of low power nodes that are deployed to provide small area capacity/coverage. In this example, pico base stations 104, relays 108 and home base stations 110 (femto cells) are shown. A pico base station can either be similar to a macro eNB, but typically with more limited coverage, for example, having a lower max transmission power, or, be a remote radio unit connected to a main unit. A common term for such pico/relay/femto cells is "underlay cells", served by "underlay nodes". This type of network deployments are typically referred to as: "Heterogeneous Networks", "multilayer networks" or shortly "HetNets". FIG. 1b shows clusters of femto cells; however, single femto cell deployments are also possible. The cells can be either so-called "open access", or provide access only to a Closed Subscription Group (CSG).

Underlay cells typically operate at lower reference (pilot/perch) signal powers, as compared to macro cells. This means that if the cell selections as well as mobility decisions are based on received reference signal strengths, the downlink cell border will be located closer to the underlay node than to the macro node/eNB. If the uplink sensitivity for all cells is similar, or if the difference in uplink sensitivity is not equivalent to the difference in reference (pilot/perch) signal powers, then the uplink cell border will be different from the downlink cell border.

FIG. 2 illustrates a scenario where the uplink and downlink cell borders are separated. A situation where the UL and DL borders are separated may be referred to as an uplink/downlink (or downlink/uplink) imbalance in the area between the separated borders. The situation of uplink/downlink imbalance is not limited to macro cell/underlay cell combinations, but may arise also between macro cells and in locations with unfavorable radio conditions, e.g. in urban environments.

Referring to the example illustrated in FIG. 2, a first UE served by the macro node may cause significant uplink interference to the underlay node if located in an area relatively close to the underlay node. In fact, if located in the area with uplink/downlink imbalance, said UE may even have the best uplink to the underlay node/cell, but might nonetheless not have detected the underlay cell reference signal.

If a second UE, which is not yet known to the network, attempts to perform a RA to the underlay node/cell in the presence of UEs such as the first UE, the underlay node may have difficulties distinguishing the RA request from the uplink interference generated by the UEs served by the macro node. Consequently, the RA attempts of the second UE may fail repeatedly.

One way to relieve this situation of significant interference to the underlay node is to consider an underlay cell range expansions by considering offsets in the cell selection and/or mobility decisions. Thereby, potentially interfering UEs served by the macro node will be at a longer distance away from the underlay node, and thereby induce less interference to the underlay node. However, this also means that some UEs served by the underlay node can be subjected to critical interference from the macro node in the downlink.

SUMMARY

It would be desirable to achieve adequate performance in both uplink and downlink in a cell subjected to inter-cell interference. It is an object of the invention to support RA in areas with an uplink/downlink imbalance.

According to a first aspect, a method is provided in a network node A for supporting RA in a cellular communication system. The method comprises determining at least one uplink radio resource amongst a plurality of radio resources. The method further comprises refraining from scheduling uplink communication in the at least one uplink radio resource, thus leaving the at least one uplink radio resource unscheduled, and thus enabling a UE in an area with an uplink/downlink imbalance to perform RA to a neighbor second network node (B)

According to a second aspect, a network node A is provided for supporting RA in a cellular communication system. The network node A comprises a functional unit adapted to determine at least one uplink radio resource amongst a plurality of radio resources. The network node A further comprises a functional unit adapted to control uplink scheduling, such that the at least one uplink radio resource is left unscheduled, thus enabling a UE in an area with an uplink/downlink imbalance to perform RA to a neighbor second network node (B).

The above method and network node may, as indicated, be used for enabling a UE in an area with an uplink/downlink imbalance to perform RA to a neighbor second network node (B). This enables that random access transmissions can have acceptable performance despite an uplink/downlink imbalance between two cells. Further, it enables handling of the case of "hidden interferers", i.e. when UEs served by the network node A critically interferes with a neighbor second network node B, without (the UEs) having detected (based on downlink measurements) and reported this cell to the network node A.

The above method and network node may be implemented in different embodiments. The uplink radio resource (s) to be left unscheduled may be indicated to the neighbor second network node B, a neighbor third network node C and/or an OaM (Operation and Maintenance) node. Indicating the resources to be left unscheduled to a neighbor second network node B facilitates for node B to determine where it would be suitable to configure RA opportunities. Indicating the resources to be left unscheduled to a neighbor third network node C, enables the node C to align with node A in refraining from scheduling UL communication in said resources, e.g. in case node C also interferes with node B in said resources. Indicating the resources to be left unscheduled to an OaM node enables for the OaM node to inform other nodes of the unscheduled UL resources. The uplink radio resource(s) to be left unscheduled may be indicated via at least one of: an interface between radio network nodes, e.g. X2; a radio link; and an interface between radio network nodes and OaM nodes.

Further, the at least one uplink radio resource to be left unscheduled may be determined in different ways. For example, a scheme could be selected from a predefined set of possible schemes; according to instructions from an OaM node; or in accordance with a scheme used by a neighbor third network node C.

A request for adjustment of the unscheduled uplink radio resources could be received e.g. from a neighbor network node B. It could be determined whether it would be appropriate to comply with the request, and the request could be complied with or rejected in accordance with the result of the determining. The request could be for an adjustment of the quantity of radio resources left unscheduled, and/or for a relocation of the unscheduled resources in time and/or frequency. The possibility of adjusting the resources enables e.g. optimization of resource utilization, e.g. leaving as few resources unscheduled as possible. Further, the adjusting enables that an adequate number of UL radio resources are left unscheduled.

The determining of whether it is appropriate to adjust the unscheduled uplink radio resources in accordance with the request may be based on one or more of: the current load in the uplink to the network node A; the current need for RA opportunities in the network node A; and/or the current need for RA opportunities in the second network node B:

According to a third aspect, a method is provided in a network node B for supporting RA in a cellular communication system. The method comprises determining one or more uplink radio resources systematically left unscheduled by a neighbor first network node A. The method further comprises configuring RA opportunities at at least some of said one or more determined uplink radio resources, and thus enabling a UE in an area with an uplink/downlink imbalance to perform RA to the network node (B).

According to a fourth aspect, a network node B is provided for supporting RA in a cellular communication system. The network node B comprises a functional unit adapted to determine one or more uplink radio resources which are systematically left unscheduled by a neighbor first network node (A). The network node B further comprises a functional unit adapted to configure RA opportunities at at least some of said one or more determined uplink radio resources, and thus enabling a UE in an area with an uplink/downlink imbalance to perform Random Access to the network node B.

The above method and second network node have the same advantages as the method and first network node described further above. The embodiments described below have the same or similar advantages as the corresponding embodiments described above in conjunction with the method and first network node.

The above method and network node may be implemented in different embodiments. For example, in some embodiments, an indication of one or more uplink radio resources which are systematically left unscheduled by a neighbor first network node A may be received from one or more of: the neighbor first network node A; an OaM node; and a neighbor third network node C. The indication may be received over an interface between radio network nodes, a radio link and/or an interface between a radio network node and an OaM node.

The one or more uplink radio resources systematically left unscheduled by a neighbor first network node A may be determined based on an/the indication provided by the neighbor network node A; an/the indication provided by an/the OaM node; and/or an estimation of uplink interference over a period of time, performed by the network node B.

Further, in some embodiments, a current need for RA opportunities could be estimated, and an adjustment of the resources left unscheduled could be requested from the neighbor first network node A, when the current unscheduled resources do not match the estimated need. The request for adjustment may be related to the quantity of radio resources left unscheduled, and/or to the location of the unscheduled resources in time and/or frequency. The estimating of current need for RA opportunities may e.g. be based on the load on the currently available RA opportunities.

The embodiments above have mainly been described in terms of a method. However, the description above is also intended to embrace embodiments of the network nodes, configured to enable the performance of the above described features. The different features of the exemplary embodiments above may be combined in different ways according to need, requirements or preference.

BRIEF DESCRIPTION OF DRAWINGS

The invention will now be described in more detail by means of exemplifying embodiments and with reference to the accompanying drawings, in which.

DETAILED DESCRIPTION

The examples given herein will be set in an LTE environment. However, the solution described herein is equally applicable in other cellular systems having similar problems and features. Further, the examples herein will be described in a macro node/underlay node terminology. However, the solution described herein is equally applicable to other node constellations, such as e.g. macro node/macro node or underlay node/underlay node.

In terms of a "macro node" and an "underlay node", the solution described herein is based on uplink resources, systematically, e.g. periodically, left unscheduled by the macro node, in which uplink resources the underlay node can configure its Random Access (RA) opportunities, and thus enable or facilitate successful RA attempts also in areas with an uplink/downlink imbalance. Thereby, critical interference from UEs served by the macro node, to the RA procedure, may be avoided In order to clarify what is meant by uplink/downlink imbalance, this will be commented on once again. Uplink/downlink imbalance can be experienced in an area between, or in relation to, two or more base stations/nodes. The term uplink/downlink imbalance implies that the best downlink conditions, such as e.g. highest received downlink signal power, are associated with a first base station/node, while the best uplink conditions (in the same location), such as e.g. the lowest path-loss, are associated with a second base station/node.

Figure 8:
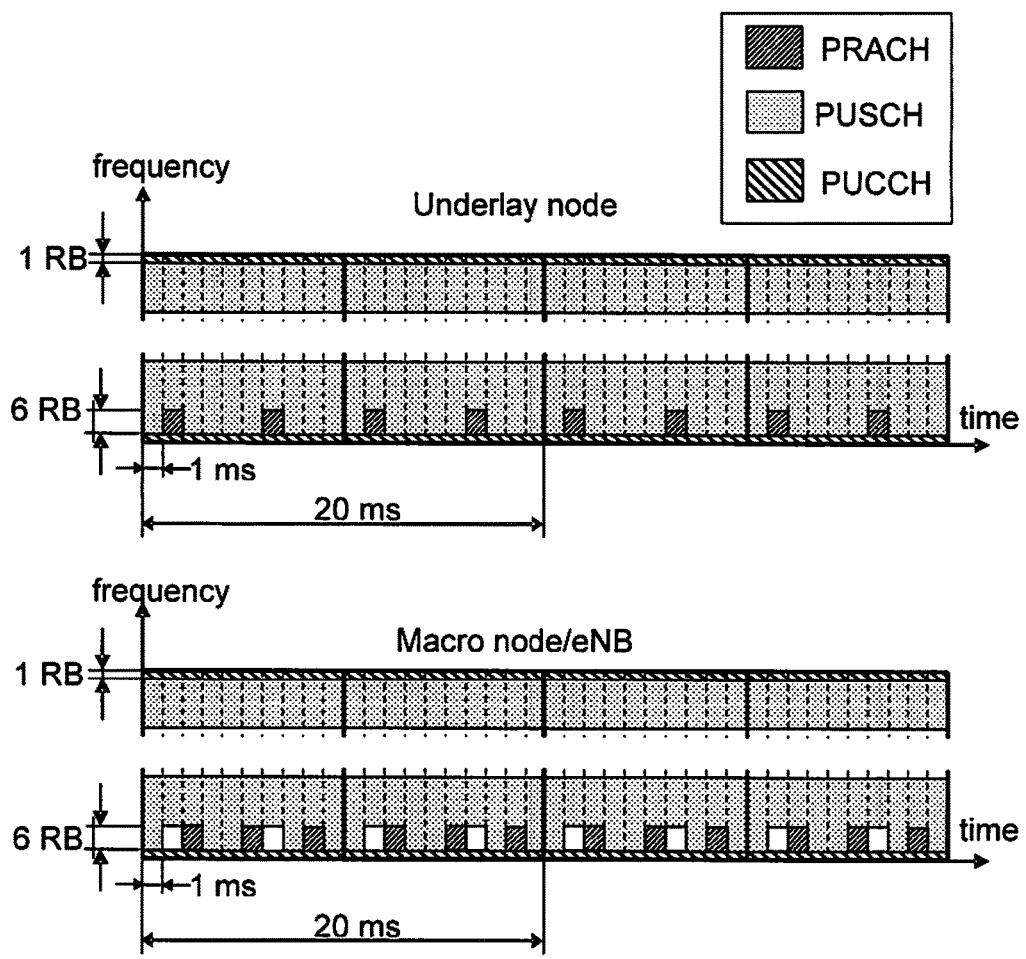
FIG. 8 is a schematic view showing UL radio resources in a network node B (upper) and a network node A (lower) when applying an exemplifying embodiment.
Figures 9, 10:
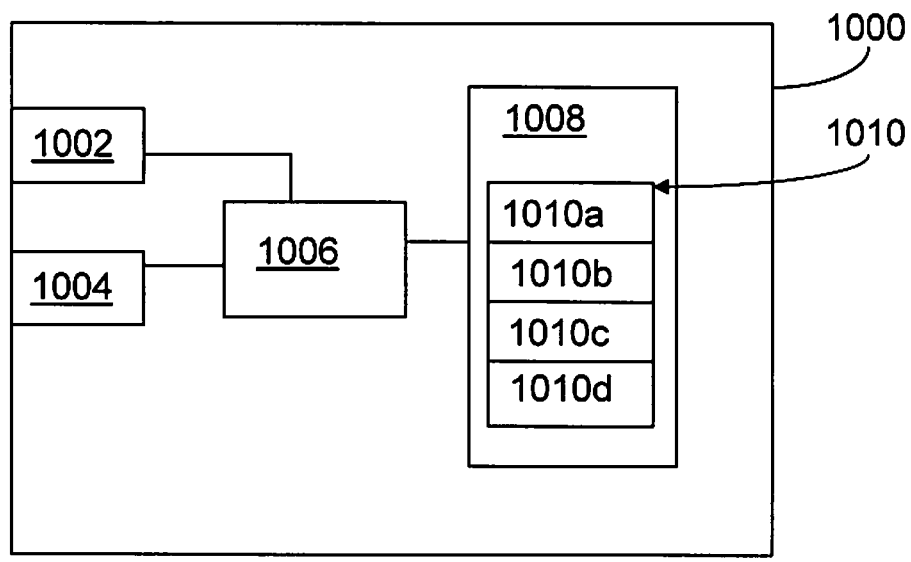
FIG. 9 is a table showing different RACH (Random Access CHannel) configurations, as specified by 3GPP.
FIG. 10 is a block diagram illustrating a network node A (or B) according to an exemplifying embodiment.

FIG. 8 illustrates two radio frames of the respective uplink of an underlay node and a macro node, when applying an exemplifying embodiment of the solution described herein in an LTE FDD (Frequency Division Duplex) system. The macro node in this example is configured with RACH configuration 11 (c.f. FIG. 9). In the example in FIG. 8, the macro node systematically refrains from scheduling uplink communication, from UEs served by the macro node, in certain resources on the PUSCH (Physical Uplink Shared CHannel), which are illustrated as white areas next to the macro node PRACH (Physical Random Access CHannel). The resources left unscheduled by the macro node in this case correspond to RACH configuration 7 (c.f. FIG. 9). The underlay node may thus use RACH configuration 7, in order to avoid uplink interference from UEs served by the macro node.

For LTE TDD (Time Division Duplex), it would also be possible to refrain from scheduling users at a specific "Random Access opportunity frequency band", since it is possible to reserve and use several frequency bands for random access preamble transmission in LTE TDD (which is presently not the case in LTE FDD).

Further, the network node, which is to leave uplink resources unscheduled, may categorize the UEs served by the network node, such that only UEs, which are determined or expected to interfere with the RA opportunities in a neighbor cell are deprived of being scheduled in said uplink resources, while the remaining UEs served by the network node continue to be scheduled during said uplink resources.

Figure 1A:
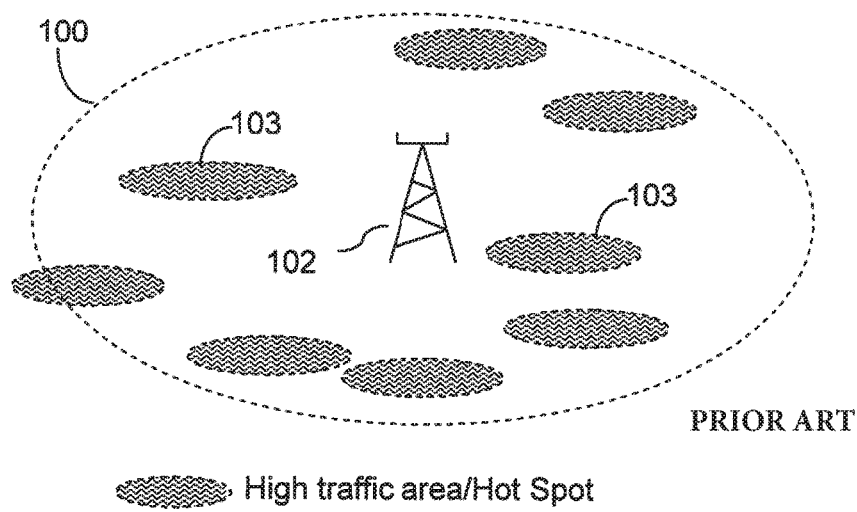
FIG. 1a is a schematic view showing a cell comprising areas with high traffic, according to the prior art.
Figure 1B:
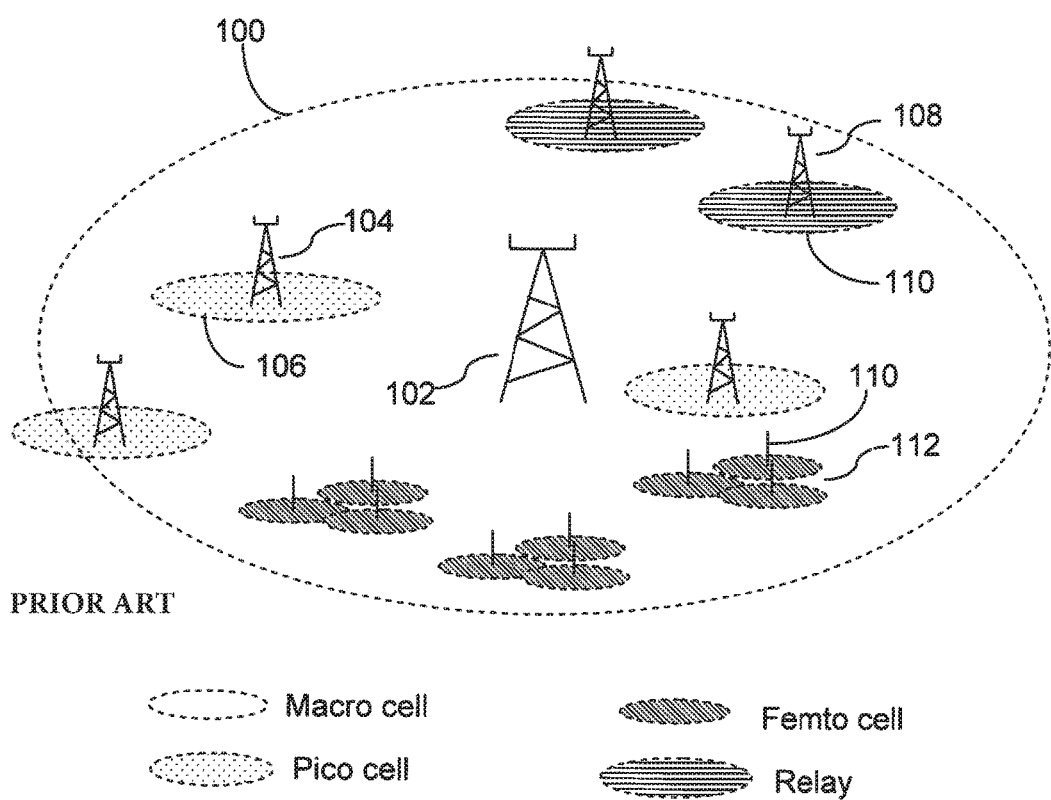
FIG. 1b is a schematic view showing an example of a constellation of different cells in a cellular communication system, according to the prior art.
Figure 2:
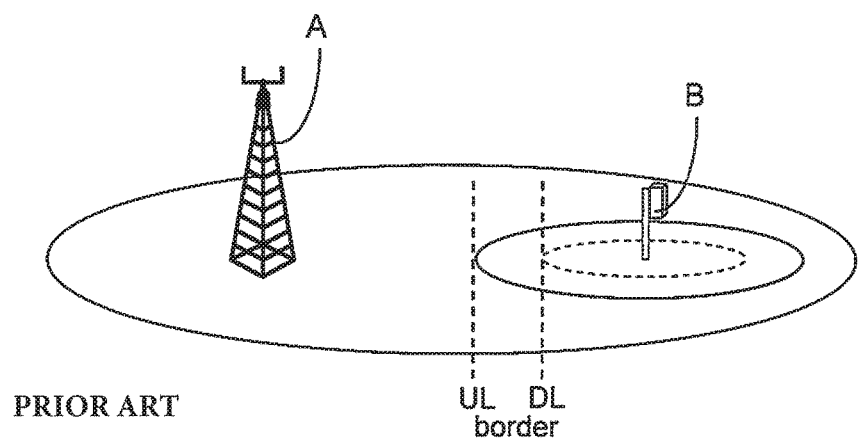
FIG. 2 is a schematic view showing an example of an area with an uplink/downlink imbalance, according to the prior art.
Figure 3:
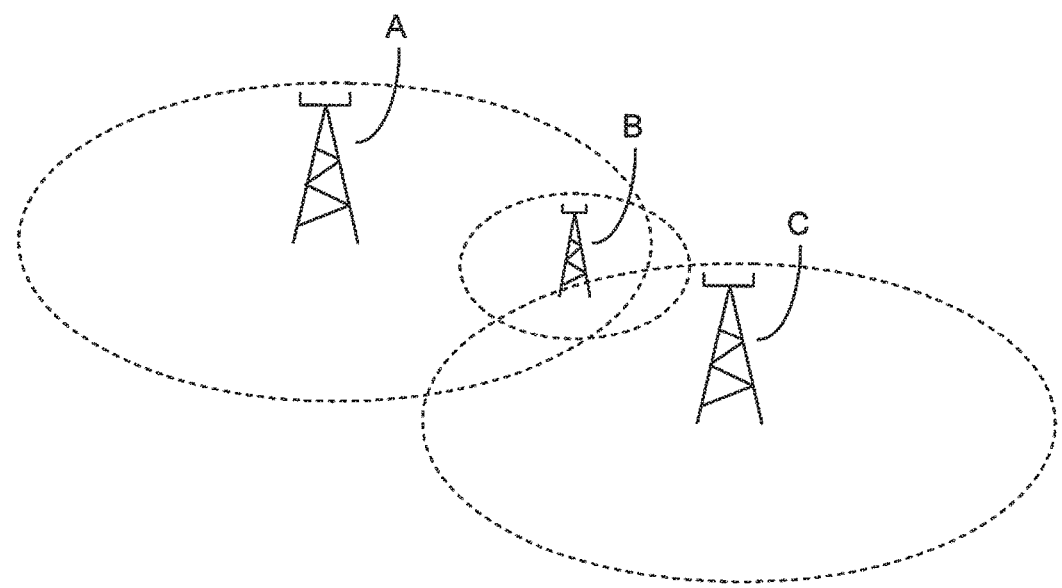
FIG. 3 is a schematic view showing a constellation of network nodes and related cells, in which different embodiments could be applied.

Regarding the exemplifying embodiments described below, network node A and network node B are assumed to serve a respective cell. It is further assumed that there is an area in relation to the two network nodes, e.g. between the nodes, where there is an uplink/downlink imbalance between the two cells or network nodes. An exemplifying cell constellation comprising a node A, a node B and a node C is illustrated in FIG. 3. The embodiments described below mainly involve a node A and a node B, while a node C is discussed only in some of the embodiments. In FIG. 3, node B is illustrated as having a lower effect than node A (and node C). The nodes A and C may be assumed to be in balance.

Exemplifying Procedures, Network Node A

Exemplifying embodiments of the procedure in a network node A of reducing interference and supporting RA performance in a cellular communication system will be described below with reference to FIGS. 4a and 4b. The network node A may be a so-called macro node/eNB/base station serving a macro cell, as illustrated in FIG. 3.

Uplink radio resources to be left unscheduled are determined in an action 404. In said UL radio resources, no UEs, served by the network node A, will get permission to transmit (be scheduled). The UL radio resources to be left unscheduled could be determined in different ways. For example, the resources could be selected, e.g. randomly, from a predefined set of possible patterns or schemes. The selection could further be based e.g. on information from a neighbor node C, related e.g. to UL radio resources left unscheduled by said node C. Such information from a neighbor node C could be received in an action 402. The UL resources could be selected or determined in correspondence with the UL resources left unscheduled by the node C. Alternatively, instructions from e.g. an OaM (Operation and Maintenance) node could be received in the action 402. The OaM node may have information regarding the situation in neighboring network nodes and cells. The instructions and/or information could be indications about what uplink radio resources to leave unscheduled. Such indications could comprise a RACH configuration number, cf. FIG. 9; or e.g. a list of resources to leave unscheduled for each radio frame. The list of resources could also comprise e.g. a start time index and a period, describing a periodic sequence of resources; a set of frequency resources in case there are multiple frequency resources available for random access, or a combination of time and frequency uplink resources. Moreover, the instructions could also comprise information about how to select the users that should be affected by the scheduling restriction, if not all.

In an action 406, it is refrained from scheduling certain UL radio resources, determined e.g. as described above. Refraining here implies an active choice or action, and not a mere awaiting or "idling" e.g. due to that there are no UL traffic to be scheduled. The UL radio resources in question are deliberately and systematically, e.g. periodically, left unscheduled, and may be resources in time and/or frequency. These resources could be repeated e.g. every radio frame or more seldom. The refraining enables UEs located in an area with uplink/downlink imbalance to perform (and thus possibly be granted) RA to a neighbor network node B at said UL radio resources. The RA attempts could otherwise have failed due to interference in the UL created by UEs served by network node A, transmitting in the UL.

The UL radio resources to be left unscheduled could be indicated to one or more other nodes in an action 408. For example, the UL radio resources in question could be indicated to the neighbor node B, thus enabling said node B to adapt its RA opportunities to said UL resources. The resources could also be indicated to a neighbor node C, e.g. in order to enable node C to adapt a similar refraining from scheduling of UL resources. The resources could also be indicated to an OaM node, which in its turn could e.g. inform other nodes.

The indication to one or more other nodes could be transferred e.g. over an interface, such as the X2 interface, between the nodes, or over a radio link. The indication could further be transferred to or via e.g. an OaM node, over an interface associated with said node.

Figure 4A:
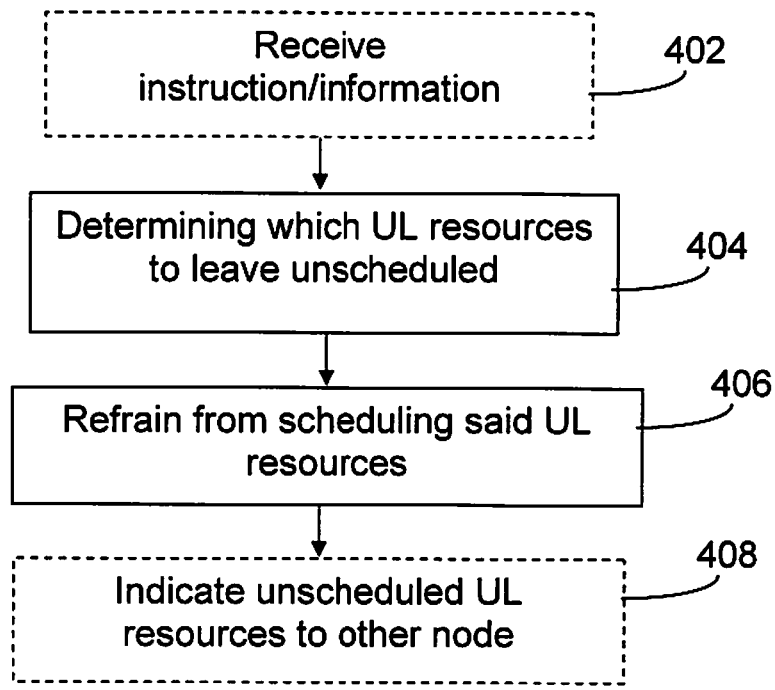
FIG. 4 is a flow chart illustrating the actions in a procedure in a network node A according to an exemplifying embodiment.
Figure 4B:
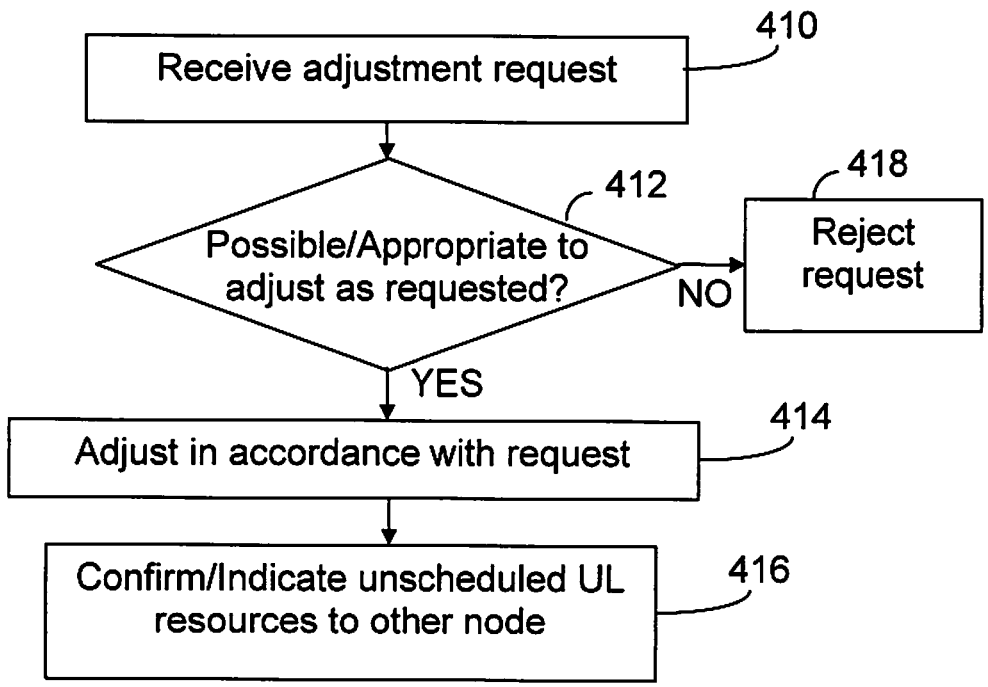

FIG. 4b illustrates an example of a procedure in network node A, which enables a neighbor node B to request adjustment of the UL radio resources left unscheduled by network node A.

A request for an adjustment of the number, and/or position in a radio frame, of UL radio resources systematically, e.g. periodically left unscheduled by node A may be received in an action 410. The request is assumed to be received from a neighbor node B, but could possibly be received e.g. from/via an OaM node.

After receiving a request for an adjustment, it could be determined in an action 412 whether it would be possible and/or appropriate to adjust e.g. the number of UL radio resources left unscheduled as requested. For example, the determining could be based on the current load in the uplink to the network node A, or e.g. on the need for RA opportunities in node A and/or node B.

If determined in action 412 that it is e.g. possible and appropriate to accept the request, the quantity/number and/or position in time and/or frequency of UL radio resources systematically left unscheduled is adjusted in accordance with the received request in an action 414. The adjustment could be confirmed or indicated to the requesting entity in an action 416. However, if it is determined in action 412 that it is not appropriate to comply with the request, for whatever reason, the request is rejected in an action 418, which may involve informing the requesting entity of the rejection.

Exemplifying Network Node A

Below, an exemplifying network node A, adapted to enable the performance of the above described procedure of reducing interference and supporting RA performance in a cellular communication system will be described with reference to FIG. 6. The network node A may be of various types, as previously described e.g. in conjunction with FIGS. 4a-b. The network node is illustrated as to communicate with other entities via a communication unit 602, which may be considered to comprise conventional means for wireless and/or wired communication. The parts of the network node which are adapted are illustrated as an arrangement 600, surrounded by a dashed line. The arrangement and/or node may further comprise other functional units 614, for providing e.g. regular base station functions, such as e.g. serving mobile terminals. The arrangement and/or node may further comprise one or more storage units 612.

The arrangement 700 could be implemented e.g. by one or more of: a processor or a micro processor and adequate software (and storage therefore), a Programmable Logic Device (PLD) or other electronic component(s)/processing circuit(s) configured to perform the actions mentioned above.

The network node 601 may comprise a receiving unit 604, adapted to receive e.g. instructions, indications and/or requests from other nodes as described above. The network node 601 comprises a determining unit 606, which is adapted to determine which UL radio resources that are to be left unscheduled, as described above. The network node further comprises a control node 608, which is adapted to control uplink scheduling such that certain radio resources are systematically, e.g. periodically, left unscheduled, i.e. that it is refrained from scheduling UL communication from UEs served by the network node A 601 in said UL radio resources. This could also be described or regarded as reserving a set of UL radio resources for a higher, "altruistic" purpose, namely enabling RA for certain UEs, which are possibly unknown to the network. By refraining from scheduling uplink communication in said UL radio resources, Random Access to a neighbor network node B, for a UE in an area with an uplink/downlink imbalance, is enabled, even in the presence of nearby active UEs served by the network node A 601. The network node may further comprise an indication unit 610, which is adapted to indicate the UL radio resources to be left unscheduled to other entities, e.g. the network node B, another neighbor network node C, or an OaM node, as described above.

As previously mentioned, the network node A 601, e.g. the receiving unit 604, may be adapted to receive requests from a network node B, concerned by the unscheduled resources, for an adjustment of e.g. the number of UL resources left unscheduled. The network node A 601, e.g. the determining unit 606 or another functional unit, may also be accordingly adapted to determine whether such a request could and/or should be accepted, as described above. The network node A 601, e.g. the control unit 608 or another functional unit, may also be accordingly adapted to adjust the UL radio resources to be left unscheduled in accordance with the request. Accordingly, the network node A 601, e.g. the indication unit 610 or another functional unit, could be adapted to reject the request, when the request could not or should not be accepted and complied with.

Exemplifying Procedures, Network Node B

Figure 5:
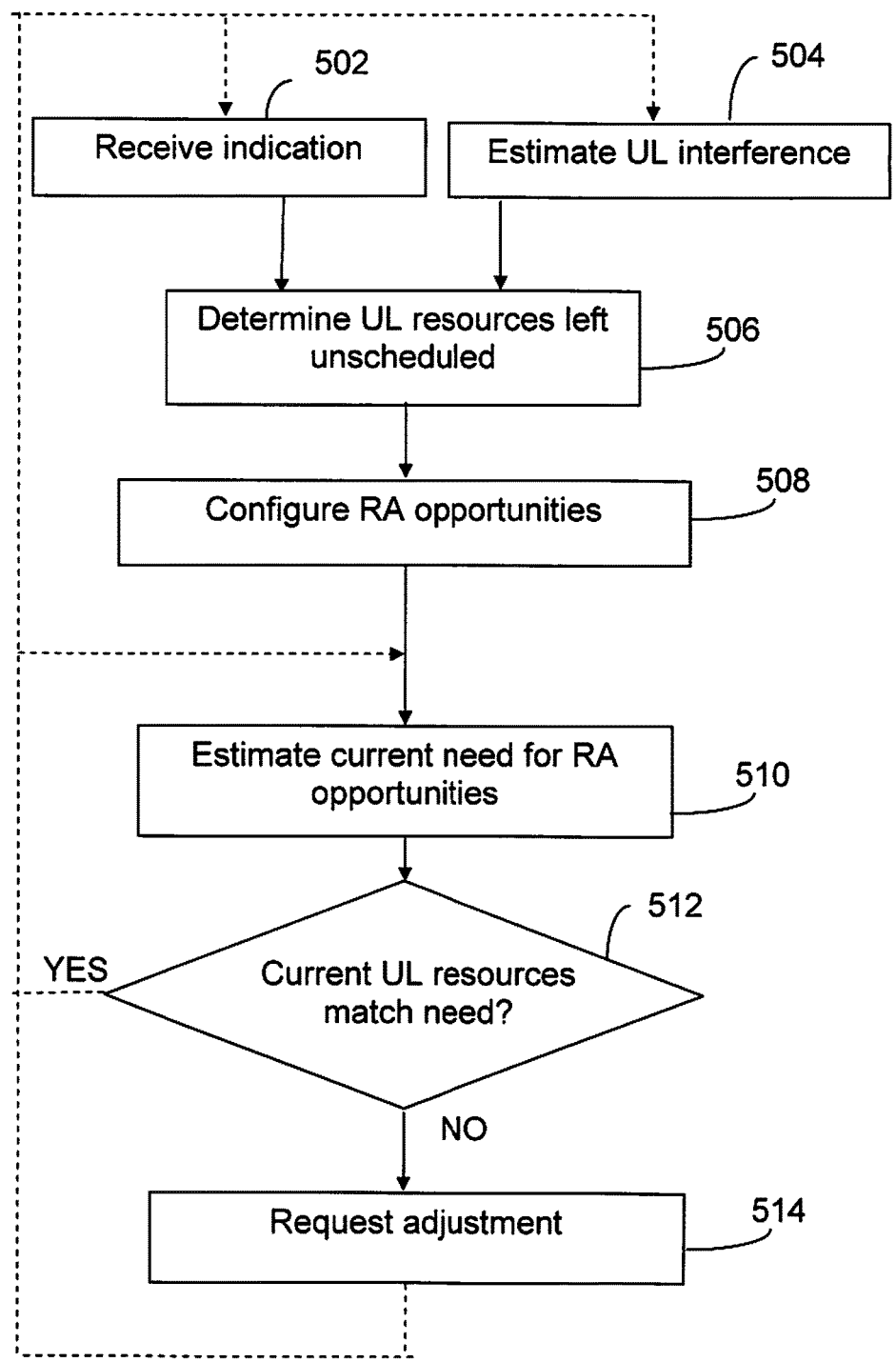
FIG. 5 is a flow chart illustrating the actions in a procedure in a network node B according to an exemplifying embodiment.

Exemplifying embodiments of the procedure in a network node B of reducing interference and supporting RA performance in a cellular communication system will be described below with reference to FIG. 5. The network node B may be a so-called underlay node/eNB/base station, serving an underlay cell.

It is determined in an action 506, which UL radio resources that are systematically, e.g. periodically, left unscheduled by a neighbor node A. The determining may be based on an indication, e.g. from the neighbor node A or from an OaM node, or, be based on an estimation of uplink interference over a period of time, performed by the network node B. Such an indication of UL resources from another node may be received in an action 502, e.g. over an interface between the nodes, such as the X2 interface, over a radio link or via one or more OaM nodes. The estimation of uplink interference over a period of time could be performed in an action 504.

Further, RA opportunities are configured in UL radio resources in an action 508, based on what is determined in action 506. The RA opportunities are configured in all or some of the UL radio resources that are left unscheduled by network node A. Information on the configured RA opportunities is communicated according to conventional methods therefore, e.g. broadcasted within a cell served by the network node B, sent dedicatedly to individual UEs, and/or indicated to an OaM node. The performing of the actions described above enables RA to the network node B for a UE located in an area with an uplink/downlink imbalance in relation to the network nodes A and B, even when there are active UEs, served by the network node A, nearby.

Further, there may be actions taken aiming to adjust the number of UL resources, e.g. per radio frame, left unscheduled by the neighbor node A. For example, the current need for RA opportunities could be estimated in an action 510. Such an estimation could e.g. be based on the load on the currently available RA opportunities. If the load is low or non-existing, fewer RA opportunities may be needed, and inversely, if the load on the currently available RA opportunities is high, more RA opportunities may be needed. It may be determined in an action 512, whether the current number of RA opportunities and/or current number of UL resources, e.g. in a radio frame, left unscheduled by the network node A (since the number of UL resources left unscheduled and the number of configured RA opportunities do not necessarily need to match, even though that is the envisaged typical scenario) match the current need for RA opportunities.

If the current number of RA opportunities and/or current number of UL resources left unscheduled by the network node A do match the current need, no immediate action is taken until e.g. a new estimation is performed in action 510, e.g. after a certain amount of time has elapsed. If, on the other hand, the current need for RA opportunities is found to be larger or smaller than what is available, a request for an adjustment could be sent to network node A in an action 514. If such a request is complied with by the network node A, the RA opportunities could be reconfigured, and the new RA opportunities communicated as previously described.

Exemplifying Network Node B

Below, an exemplifying network node B, adapted to enable the performance of the above described procedure of reducing interference and supporting RA performance in a cellular communication system will be described with reference to FIG. 7. The network node B may be of various types, as previously described. The network node is illustrated as to communicate with other entities via a communication unit 702, and may comprise other functional units 714 or storage units 712 in a similar manner as described in conjunction with the network node A illustrated in FIG. 6.

The adapted parts of the network node B are illustrated as an arrangement 700, surrounded by a dashed line. The arrangement 700 could be implemented e.g. by one or more of: a processor or a micro processor and adequate software (and storage therefore), a Programmable Logic Device (PLD) or other electronic component(s)/processing circuit(s) configured to perform the actions mentioned above.

The network node 701 may comprise a receiving unit 704, adapted to receive e.g. indications from one or more other nodes, as of which UL radio resources that are left unscheduled by a network node A, and thus are suitable for RA opportunities to the network node B 701. Alternatively, or in addition, the receiving unit may be adapted to receive or retrieve the result of measurements on UL interference over a period of time. The network node comprises a determining unit 706, which is adapted to determine which UL radio resources that are systematically left unscheduled by a/the network node A. The UL radio resources left unscheduled may be determined based on indications received from anther node and/or an estimation of UL interference, as described above.

The network node B further comprises a configuring unit, which is adapted to configure RA opportunities in some or all of the UL radio resources left unscheduled by network node A.

The network node B 701, e.g. the determining unit 706 or some other, e.g. additional unit, may further be adapted to estimate the current need for RA opportunities, as described above. Additionally, a functional unit in the network node B 701 may be adapted accordingly to determine whether the current need for RA opportunities matches the current number of UL radio resources left unscheduled (and/or the number of current RA opportunities, as mentioned above). A functional unit in the network node B 701, e.g. a requesting unit 710, may be adapted accordingly to request an adjustment of the number of UL radio resources left unscheduled from the network node A, when determined that the current need for RA opportunities matches the current number of UL radio resources left unscheduled by network node A.

Exemplifying Arrangement, FIG. 10

Figure 6:
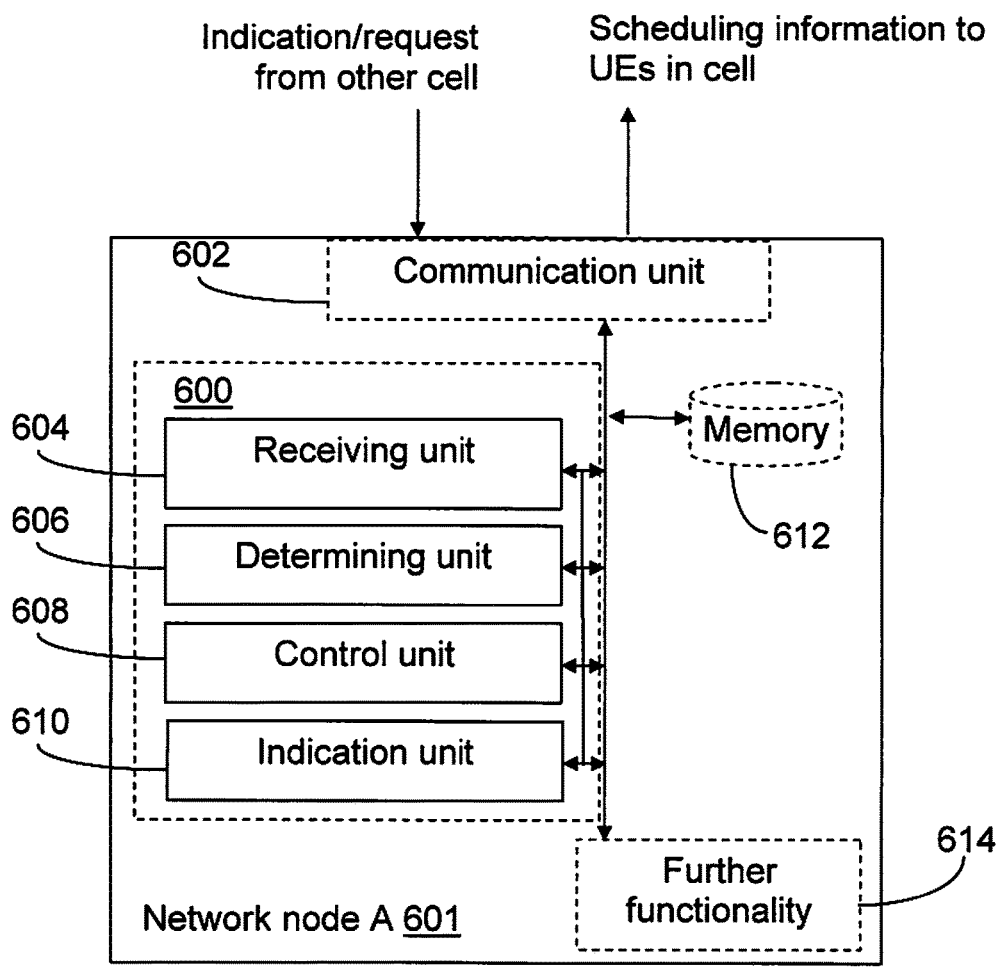
FIG. 6 is a block diagram illustrating a network node A according to an exemplifying embodiment.

FIG. 10 schematically shows an embodiment of an arrangement 1000 in a network node, which also can be an alternative way of disclosing an embodiment of the arrangement in a network node illustrated in FIG. 6. Comprised in the arrangement 1000 are here a processing unit 1006, e.g. with a DSP (Digital Signal Processor). The processing unit 1006 may be a single unit or a plurality of units to perform different actions of procedures described herein. The arrangement 1000 may also comprise an input unit 1002 for receiving signals from other entities, and an output unit 1004 for providing signal(s) to other entities. The input unit 1002 and the output unit 1004 may be arranged as an integrated entity.

Furthermore, the arrangement 1000 comprises at least one computer program product 1008 in the form of a non-volatile memory, e.g. an EEPROM (Electrically Erasable Programmable Read-Only Memory), a flash memory and a hard drive. The computer program product 1008 comprises a computer program 1010, which comprises code means, which when executed in the processing unit 1006 in the arrangement 1000 causes the arrangement and/or the network node to perform the actions e.g. of the procedure described earlier in conjunction with FIG. 4*a*.

The computer program 1010 may be configured as a computer program code structured in computer program modules. Hence, in an exemplifying embodiment, the code means in the computer program 1010 of the arrangement 1000 may comprise a receiving module 1010*a* for receiving e.g. instructions and/or requests. The computer program comprises a determining module 1010*b* for determining at least one uplink radio resource amongst a plurality of radio resources. The computer program 1010 further comprises a control module 1010*c* for controlling uplink scheduling, such that the at least one uplink radio resource is left unscheduled, thus enabling a UE in an area with an uplink/downlink imbalance to perform Random Access to a neighbor second network node (B). The computer program 1010 could further comprise other modules, such as an indication module 1010d for indicating the uplink radio resources left unscheduled to other nodes.

The modules 1010a-d could essentially perform the actions of the flow illustrated in FIG. 4a, to emulate the arrangement in a network node illustrated in FIG. 6. In other words, when the different modules 1010a-d are executed in the processing unit 1006, they may correspond to the units 604-610 of FIG. 6.

Although the code means in the embodiment disclosed above in conjunction with FIG. 10 are implemented as computer program modules which when executed in the processing unit causes the arrangement and/or network node to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

Figure 7:
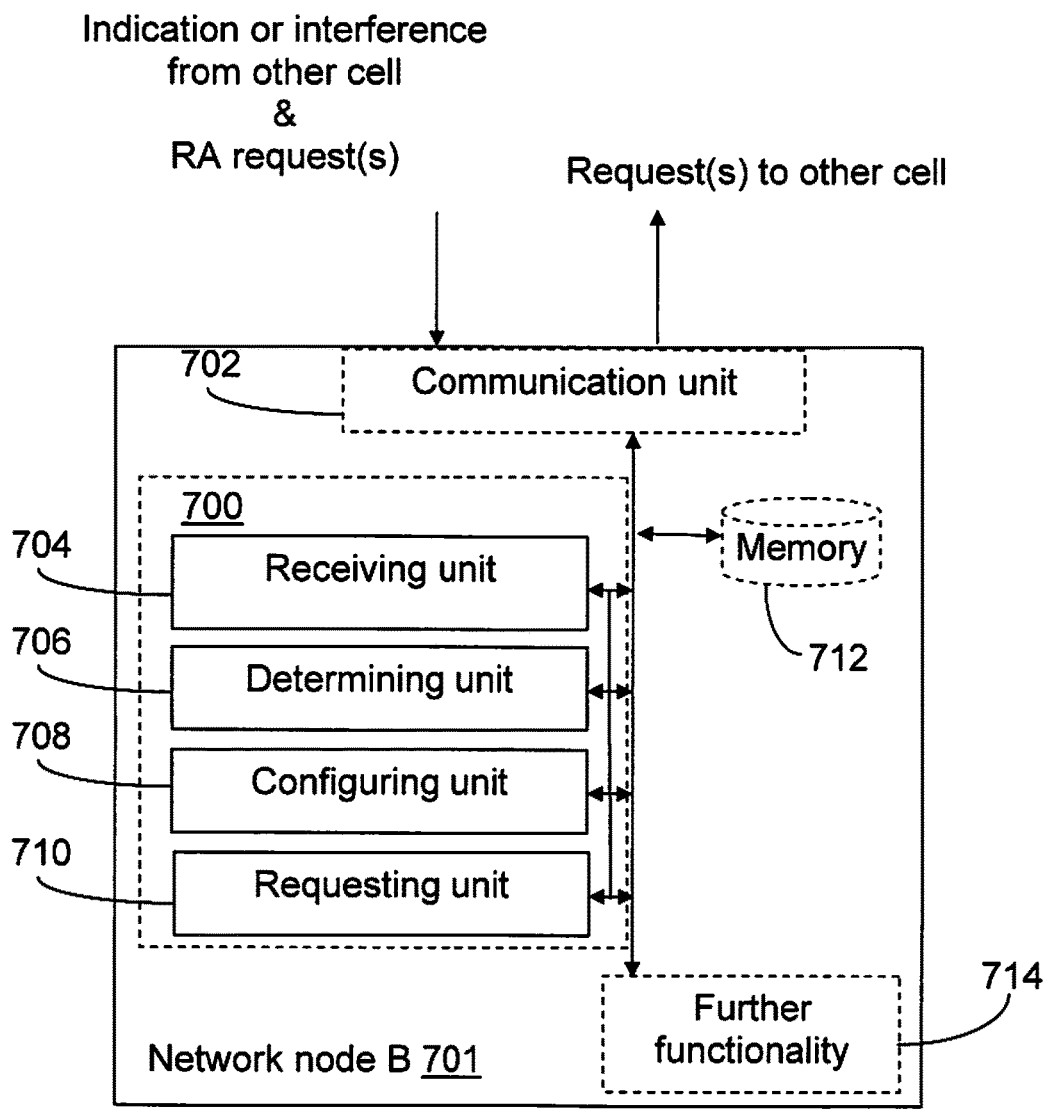
FIG. 7 is a block diagram illustrating a network node B according to an exemplifying embodiment.

In a similar manner, an exemplifying embodiment comprising computer program modules could be described for the arrangement in a network node B, illustrated in FIG. 7.

Figure 11:
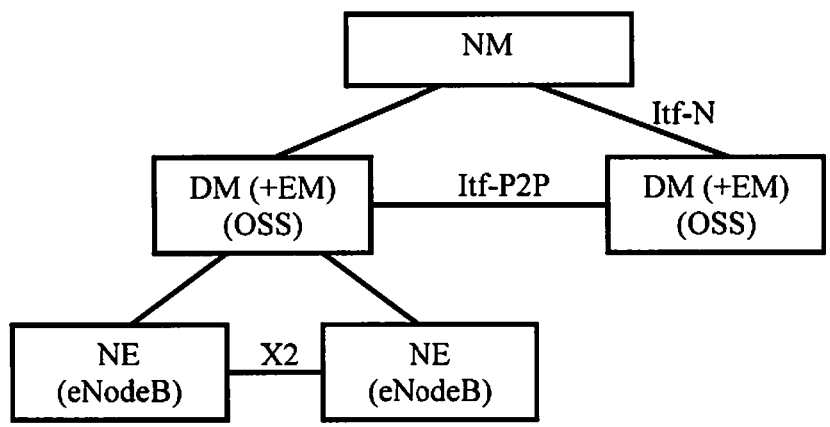
FIG. 11 is a block diagram showing an exemplifying network management system comprising OaM nodes.

In some of the embodiments described above, it is referred to an "OaM node". By OaM node is meant a node in a network management system, e.g. as illustrated in FIG. 11. In FIG. 11 is shown a number of Network Elements (NEs), which may be e.g. macro nodes, pico nodes, relays, etc., connected to an OaM system, also referred to as a Domain Manager (DM), which may comprise or be associated with an Element Manager (EM). The OaM system may also be referred to as an Operations Support System (OSS). Different NEs or nodes may be connected to different OSS', e.g. based on different characteristics, manufacturers, or limitations in terms of e.g. maximum number of nodes that could be served by an OSS. Therefore, multiple DMs or OSSs are typically managed unifiedly via a Network Management System (NMS).

It is to be understood that the choice of interacting units or modules, as well as the naming of the units are only for exemplifying purpose, and client and server nodes suitable to execute any of the methods described above may be configured in a plurality of alternative ways in order to be able to execute the suggested process actions. The order terms "first", "second" and "third", and letters "A", "B" and "C" have been used in association with network nodes attempting to facilitate for a reader to separate the different network nodes from each other. Thus, in claims 12-25 below, the "other" network node has been denoted "the first network node (A)". If preferred, this could be changed, such that the "other" network node A is referred to as "a second network node (A)".

It should also be noted that the units or modules described in this disclosure are to be regarded as logical entities and not with necessity as separate physical entities.

It should also be understood that even though LTE is used to exemplify the method, it is applicable to any cellular system where random access is assigned dedicated resources and nodes can determine one or more uplink radio resources which are systematically/periodically left unscheduled in order to facilitate the reception of random access in other nodes. In case of WCDMA (Wideband Code Division Multiple Access), the RNC (Radio Network Controller) controls the base stations, and can indicate which uplink radio resources that are periodically left unscheduled by some nodes in order to facilitate the random access reception at other nodes. The RNC also may configure random access for nodes that need protected random access at such unscheduled resources. Another configuration option is via O&M.

The invention claimed is:

1. A method in a network node in a cellular communication system for supporting random access, the method comprising:
   determining at least one uplink radio resource, amongst a plurality of radio resources that are available to the network node for scheduling, to be set aside to facilitate random access by user equipments to one or more other network nodes;
   sending scheduling information to one or more user equipments served by the network node, while refraining from scheduling uplink communication in the at least one uplink radio resource, thus leaving the at least one uplink radio resource unscheduled, and thus enabling a user equipment in an area with an uplink/downlink imbalance to perform random access to a neighbor second network node; and
   indicating the determined, unscheduled, at least one uplink radio resource to at least one of the neighbor second network node, a neighbor third network node, and an operations and maintenance (OaM) node.

2. The method of claim 1, wherein the at least one unscheduled uplink radio resource is indicated via at least one of:
   an interface between radio network nodes;
   a radio link;
   an interface between radio network nodes and OaM nodes.

3. The method of claim 1, where the at least one uplink radio resource to be left unscheduled are determined according to one or more of:
   by selection from a predefined set of possible schemes;
   according to instructions from operations and maintenance (OaM) node;
   in accordance with a scheme used by a neighbor third network node.

4. The method of claim 1, further comprising:
   receiving a request for an adjustment of the unscheduled uplink radio resources, and,
   when determined to be appropriate:
   adjusting the unscheduled uplink radio resources in accordance with the request; and
   otherwise:
   rejecting the request.

5. The method of claim 4, wherein the determining of whether it is appropriate to adjust the unscheduled uplink radio resources in accordance with the request is based on one or more of:
the current load in the uplink to the network node;
the current need for random access opportunities in the network node;
the current need for random access opportunities in the second network node.

6. A network node in a cellular communication system supporting random access, the network node comprising:
a communication circuit configured to communicate with one or more other nodes in the cellular communication system; and
a processing circuit configured to:
determine at least one uplink radio resource, amongst a plurality of radio resources that are available to the network node for scheduling, to be set aside to facilitate random access by user equipments to one or more other network nodes;
control uplink scheduling, by sending scheduling information to one or more user equipments served by the network node, such that the at least one uplink radio resource is left unscheduled, thus enabling a UE in an area with an uplink/downlink imbalance to perform random access to a neighbor second network node; and
use the communication circuit to indicate the determined, unscheduled, at least one uplink radio resource to at least one of the neighbor second network node, a neighbor third network node, and an operations and maintenance (OaM) node.

7. The network node of claim 6, wherein the processing circuit is configured to determine the at least one uplink radio resource to be left unscheduled according to one or more of:
by selection from a predefined set of possible schemes;
according to instructions from an OaM node; and
in accordance with a scheme used by a neighbor third network node.

8. The network node of claim 6, wherein the processing circuit is further configured to:
receive, from a neighbor second network node, a request for an adjustment of the unscheduled uplink radio resources; and
when determined to be appropriate, to adjust the unscheduled uplink radio resources in accordance with the request, and to otherwise reject the request.

9. The network node of claim 8, wherein the processing circuit is configured to determine whether it is appropriate to adjust the unscheduled uplink radio resources in accordance with the request based on one or more of:
the current load in the uplink to the network node;
the current need for random access opportunities in the network node; and
the current need for random access opportunities in the second network node.

10. A method in a network node in a cellular communication system for supporting random access, the method comprising:
determining one or more uplink radio resources available for scheduling by a neighbor first network node but systematically left unscheduled by the neighbor first network node; and
configuring random access opportunities at at least some of said one or more determined uplink radio resources, by broadcasting information on the configured random access opportunities within a cell served by the network node or by sending information on the configured random access opportunities to one or more user equipments in a dedicated manner;
thus enabling a user equipment in an area with an uplink/downlink imbalance to perform random access to the network node.

11. The method of claim 10, further comprising:
receiving an indication of one or more uplink radio resources which are systematically left unscheduled by the neighbor first network node from one or more of:
the neighbor first network node;
an operations and maintenance (OaM) node;
a neighbor third network node.

12. The method of claim 10, wherein the indication is received over one or more of:
an interface between radio network nodes;
a radio link;
an interface between a radio network node and an operations and maintenance (OaM) node.

13. The method of claim 10, wherein the one or more uplink radio resources systematically left unscheduled by a neighbor first network node are determined based on at least one of:
an indication provided by the neighbor network node;
an indication provided by an operations and maintenance (OaM) node;
an estimation of uplink interference over a period of time, performed by the network node.

14. The method of claim 10, further comprising:
estimating a current need for random access opportunities; and
requesting, from the neighbor first network node, an adjustment of the unscheduled uplink radio resources when the current unscheduled resources do not match the estimated need.

15. The method of claim 14, wherein the request for adjustment is related to one or more of
a quantity of unscheduled resources;
a location in time or frequency of the unscheduled resources.

16. The method of claim 14, wherein the estimating of current need for random access opportunities is based on the load on the currently available random access opportunities.

17. A network node in a cellular communication system for supporting random access, the network node comprising:
a communication circuit configured to communicate with one or more other nodes in the cellular communication system; and
a processing circuit configured to determine one or more uplink radio resources available for scheduling by a neighbor first network node but systematically left unscheduled by a neighbor first network node
and to configure random access opportunities at at least some of said one or more determined uplink radio resources, by broadcasting information on the configured random access opportunities within a cell served by the network node or by sending information on the configured random access opportunities to one or more user equipments in a dedicated manner, thus enabling a user equipment in an area with an uplink/downlink imbalance to perform random access to the network node.

18. The network node of claim 17, wherein the processing circuit is configured to receive, via the communication circuit, an indication of one or more uplink radio resources which are systematically left unscheduled by the neighbor first network node.

19. The network node of claim 18, wherein the processing circuit is configured to receive the indication over one or more of:
   an interface between radio network nodes;
   a radio link;
   an interface between a radio network node and an OaM node.

20. The network node of claim 17, wherein the processing circuit is configured to determine the one or more uplink radio resources systematically left unscheduled by a neighbor first network node based on at least one of:
   an indication provided by the neighbor first network node;
   an indication provided by an operations and maintenance (OaM) node;
   an indication provided by a neighbor third network node;
   an estimation of uplink interference over a period of time, performed by the network node.

21. The network node of claim 17, wherein the processing circuit is configured to estimate a current need for random access opportunities; and to request, from the neighbor first network node, an adjustment of the unscheduled uplink radio resources when the current unscheduled resources do not match the estimated need.

22. The network node of claim 21, wherein the request for adjustment is related to one or more of
   the quantity of unscheduled resources;
   the location in time of the unscheduled resources;
   the location in frequency of the unscheduled resources.

23. The network node of claim 21, wherein the processing circuit is configured to estimate the current need for random access opportunities based on the load on the currently available random access opportunities.

* * * * *